May 25, 1926.
W. DUNCAN
1,586,031
MASSAGE AND SHAMPOO COMB
Filed March 10, 1925
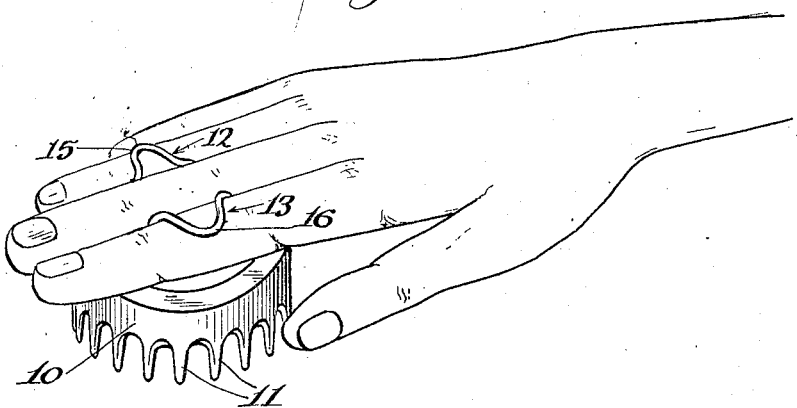
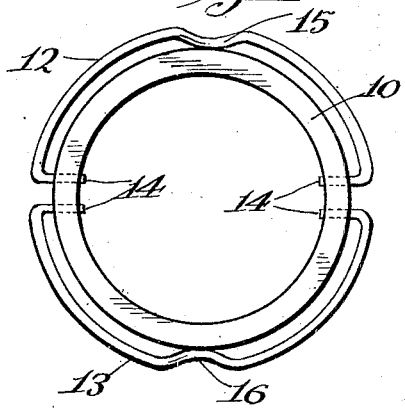
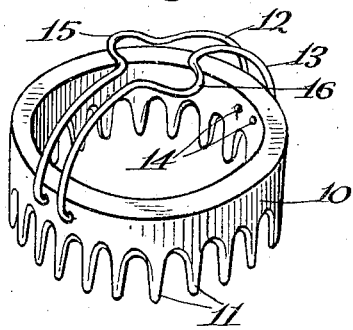
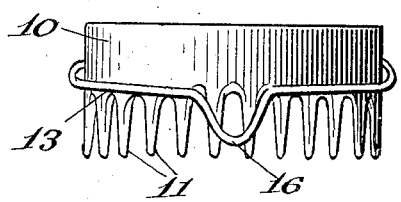
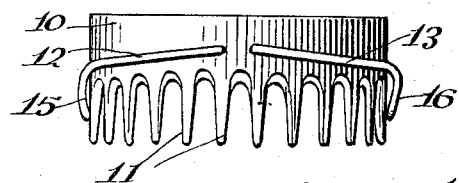
Inventor
William Duncan
By Hazard and Miller
Attorneys
Witness:

Patented May 25, 1926.

1,586,031

UNITED STATES PATENT OFFICE.

WILLIAM DUNCAN, OF LOS ANGELES, CALIFORNIA.

MASSAGE AND SHAMPOO COMB.

Application filed March 10, 1925. Serial No. 14,439.

This invention relates to improvements in massage or shampoo combs.

The primary object of the invention is to provide an improved massage or shampoo comb consisting of a circular or annular comb which is provided with an improved means whereby the comb may be readily grasped in massaging or shampooing, the improved grasping means preventing the slipping of the comb from the hand, even though the comb should become wet.

With the foregoing and other objects in view which will be made manifest in the following detailed description and pointed out in the appended claims, reference is had to the accompanying drawings for an illustrative embodiment of the invention, wherein:

Figure 1 is a perspective view of the improved comb shown in applied position;

Fig. 2 is a plan view of the comb, the handle forming member or bail parts being shown as separated;

Fig. 3 is a perspective view of the improved comb;

Fig. 4 is a side elevation of the comb taken in the direction of the arrow 4 upon Fig. 2; and Fig. 5 is a side elevation of the comb taken in the direction of the arrow 5 upon Fig. 2.

Referring to the accompanying drawings wherein similar reference characters designate similar parts throughout, the improved comb consists of a comb having an annular or circular body 10 beneath which depend teeth 11. The body of the comb with its teeth is of conventional construction and may be made in any suitable manner; but in the preferred form of invention, this comb is preferably made of metal and is molded so that there are no seams connecting the ends of the comb forming the body. In this manner a seamless, circular or annular comb construction is provided, which will not have its ends separate upon becoming wet.

A pair of bail parts 12 and 13 are formed of wire. These bail parts have their ends bent to provide pintles 14 which extend through apertures formed through the body 10 of the comb, so that each of the bail parts is pivotally secured to the body of the comb. The bail parts 12 and 13 are parallel to each other, and are slightly spaced apart, and these parts extend approximately diametrically across the body of the comb. Each of the bail parts 12 and 13 is bent, as indicated at 15 and 16 respectively, to provide laterally extending projections, extending oppositely from each other. The bail parts 12 and 13 provide a handle by which the comb may be readily held by a person's hand with the comb disposed beneath the fingers. As clearly shown in Fig. 1, the middle finger is adapted to be placed between the bail parts 12 and 13, with the index finger disposed adjacent the side of the bail part 12 beneath the projection 15, and the third finger disposed adjacent the outer side of the bail part 13 and beneath the projection 16. The middle finger tends to separate the bail parts 12 and 13, causing the projections 15 and 16 to bear down upon the tops of the index and third fingers. In this manner the improved comb may be firmly gripped by the hand with the comb disposed beneath the fingers, permitting the comb to be readily moved over the scalp in massaging or shampooing without danger of the comb slipping from the hand. When the hand is removed from the comb, the bail parts 12 and 13 are capable of swinging downwardly over the sides of the comb, as shown in Figs. 4 and 5, so that the comb in this position may occupy a minimum amount of space.

It will be understood that various changes in the detail of construction may be made without departing from the spirit or scope of the invention as defined by the appended claims.

I claim:

1. In combination with a massage or shampoo comb, a pair of bail parts secured to the comb, said bail parts being substantially parallel and providing oppositely extending projections as and for the purpose described.

2. A massage or shampoo comb comprising a circular comb, and a pair of parallel bail parts pivotally secured to the comb and extending approximately diametrically thereacross, said bail parts being formed with bends providing oppositely extending projections as and for the purpose described.

In testimony whereof I have signed my name to this specification.

WILLIAM DUNCAN.